(12) United States Patent
Abe

(10) Patent No.: US 9,723,807 B2
(45) Date of Patent: Aug. 8, 2017

(54) PET TOILET

(71) Applicant: KAO CORPORATION, Tokyo (JP)

(72) Inventor: Keiji Abe, Moka (JP)

(73) Assignee: KAO CORPORATION, Tokyo (JP)

( * ) Notice: Subject to any disclaimer, the term of this patent is extended or adjusted under 35 U.S.C. 154(b) by 435 days.

(21) Appl. No.: 14/380,444

(22) PCT Filed: Feb. 27, 2013

(86) PCT No.: PCT/JP2013/055047
§ 371 (c)(1),
(2) Date: Aug. 22, 2014

(87) PCT Pub. No.: WO2013/133095
PCT Pub. Date: Sep. 12, 2013

(65) Prior Publication Data
US 2015/0047570 A1 Feb. 19, 2015

(30) Foreign Application Priority Data
Mar. 7, 2012 (JP) .................................. 2012-050372

(51) Int. Cl.
*A01K 1/01* (2006.01)
(52) U.S. Cl.
CPC .......... *A01K 1/0107* (2013.01); *A01K 1/0125* (2013.01)
(58) Field of Classification Search
CPC ........................... A01K 1/0107; A01K 1/0125
(Continued)

(56) References Cited

U.S. PATENT DOCUMENTS 3,818,865 A * 6/1974 Sinclair ................ A01K 1/0114
119/161
4,774,907 A * 10/1988 Yananton ............. A01K 1/0152
119/169
(Continued)

FOREIGN PATENT DOCUMENTS

EP 1 157 608 A2 11/2001
GB 2 372 688 A 9/2002
(Continued)

OTHER PUBLICATIONS

International Preliminary Report on Patentability and English translation of the Written Opinion of the International Searching Authority (Forms PCT/IB/338, PCT/IB/373 and PCT/ISA/237), dated Sep. 18, 2014, for International Application No. PCT/JP2013/055047.

(Continued)

*Primary Examiner* — David Parsley
*Assistant Examiner* — Danielle Clerkley
(74) *Attorney, Agent, or Firm* — Birch, Stewart, Kolasch & Birch, LLP

(57) ABSTRACT

A pet toilet (1A) of the present invention is provided with a footing-constituting member [2 (20, 21, 22)] constituting a footing for a pet conducting an excreting action and a frame (3) surrounding the footing-constituting member 2 and rectangular in a plan view. The frame (3) is configured so as to be foldable by folding one set of opposite sides (31, 31) of two sets of opposite sides constituting the frame such that central portions thereof in a lengthwise direction of the one set are directed inward of the frame. The footing-constituting member (2) is supported by supporting bodies (32) projecting from inner circumferential faces (3B) of the frame (3) inward of the frame (3) from a lower side of the footing-constituting member. The supporting bodies (32) are composed of portions of sides (30, 31) constituting the frame (3), are arranged to be approximately flush with inner (Continued)

circumferential faces (3B) of the frame (3) without projecting the inner circumferential faces (3B) to be put in a stored state during nonuse, and are caused to project inward of the frame (3) to be put in use state during use.

16 Claims, 8 Drawing Sheets

(58) Field of Classification Search
 USPC .......................................... 119/161, 165, 168
 See application file for complete search history.

(56) References Cited

U.S. PATENT DOCUMENTS

| | | | |
|---|---|---|---|
| 4,807,563 | A | 2/1989 | Berry et al. |
| 5,080,043 | A | 1/1992 | Fields |
| 5,115,766 | A * | 5/1992 | Williams ............. A01K 1/0125 119/168 |
| 5,572,951 | A | 11/1996 | Evans et al. |
| 6,532,897 | B1 | 3/2003 | Adolfsson et al. |
| 2003/0116095 | A1 | 6/2003 | Otsuji |
| 2004/0244708 | A1 | 12/2004 | Neil et al. |
| 2006/0037549 | A1* | 2/2006 | Kim ..................... A01K 1/0114 119/166 |
| 2009/0241851 | A1 | 10/2009 | Peddycoart |

FOREIGN PATENT DOCUMENTS

| | | |
|---|---|---|
| JP | 8-66135 A | 3/1996 |
| JP | 2003-506052 A | 2/2003 |
| JP | 3098845 U | 3/2004 |
| JP | 3101716 U | 6/2004 |
| JP | 2005-176715 A | 7/2005 |
| JP | 3158367 U | 4/2010 |
| JP | 4489487 B2 | 6/2010 |
| JP | 2011-45353 A | 3/2011 |
| WO | WO 2007/029830 A1 | 3/2007 |
| WO | WO 2011/080853 A1 | 7/2011 |

OTHER PUBLICATIONS

International Search Report, mailed Jun. 4, 2013, issued in PCT/JP2013/055047.

* cited by examiner (c)

PET TOILET

TECHNICAL FIELD

The present invention relates to a pet toilet used in treatment of excretion of a pet (small animal) such as a cat or a dog.

BACKGROUND ART

As a pet toilet for treating excretion of a pet such as a cat or a dog, a pet toilet which a toilet main body of is partitioned into upper and lower sections by a liquid-penetration drainboard (Sunoko), and which stores a granulated excretion treatment material forming a lavatory floor called "cat litter" in an upper layer portion and stores a liquid-retainable absorbent member including fibers, water-absorbing resin or the like in a tray of the lower layer portion is known (see Patent Literature 1, for example).

However, there is such a problem that, since a conventional pet toilet such as described in Patent Literature 1 is bulky, it requires a wide area when it is placed, and since the conventional pet toilet cannot be folded, for example, it lacks in portability when it must be carried in order to trip with a pet. Therefore, many pet toilets which have been compacted and have been reduced in weight, and are excellent in portability have been proposed (see Patent Literatures 2 to 7, for example). The pet toilets described in Patent Literatures 2 to 7 are common regarding such a point that basic configuration portions (box bodies, frames or the like) of the pet toilets are configured so as to be foldable.

CITATION LIST

Patent Literature

Patent Literature 1: US 2003116095A1
Patent Literature 2: JP H-08-66135 A
Patent Literature 3: JP2005-176715 A
Patent Literature 4: WO2007029830 A
Patent Literature 5: Utility Model Registration No. 3098845
Patent Literature 6: Utility Model Registration No. 3101716
Patent Literature 7: Utility Model Registration No. 3158367

SUMMARY OF INVENTION

Technical Problem

Since the pet toilet described in Patent Literature 2 is not configured in such a manner that a bulky toilet main body in which sand for excretion absorption is stored is foldable, it cannot be said that the pet toilet has been sufficiently compacted and reduced in weight, and there is a room for improvement in portability. Further, the pet toilet described in Patent Literature 3 is configured in such a manner that a frame and a bag body storing a treatment material of excreta are integrated to be foldable, but it has such a drawback that when the frame is spread to be placed on a floor face, the bag body comes in contact with the floor face in its folded state and the frame cannot retain a shape for a pet to enter the pet toilet to excrete. Furthermore, since the pet toilets described in Patent Literatures 3 to 7 have such a configuration that when these pet toilets are placed on a floor to be used, a bottom of a bag, a tray or the like which has stored excretion comes in direct contact with a floor face, therefore, smell of the excretion is liable to transfer to the floor face, which results in a problem about a sanitary aspect. Further, particularly, when a bottom portion of a bag, a tray or the like in which excretion is to be stored is formed of a low-strength material having a relatively thin thickness in view of a weight reduction of the tray or the like, there is a possibility that depending on a situation of the floor face, the bottom portion is broken due to friction with the floor face so that excretion leaks, which also result in a problem about a sanitary aspect. In addition, when the pet toilets described in Patent Literatures 4 to 7 are placed on a floor to be used, because soft materials are used as their constituent members, the pet toilet has no configuration that a member forming an outer face of the toilet completely encloses an absorbent member, the pet toilets do not have a sufficient function that excretion is not caused to leak, and when the toilet is moved with its state for use, it is difficult to move the toilet while maintaining the excretion in a sanitary manner.

Solution to Problems

The present invention provides a pet toilet including a footing-constituting member constituting a footing for a pet conducting an excreting action, and a frame which is rectangular in a plan view and surrounds the footing-constituting member, wherein the frame is configured so as to be foldable by folding one set of opposite sides of two sets of opposite sides constituting the frame in such a manner that lengthwise central portions of the one set of the opposite sides constituting the frame are directed inward of the frame, the footing-constituting member is supported from a lower side of the footing-constituting member by supporting bodies, the supporting bodies projecting from inner circumferential faces of the frame toward the inside of the frame, and the supporting bodies are composed of portions of sides constituting the frame, are arranged to be approximately flush with inner circumferential faces of the frame without projecting the inner circumferential faces to be put in a stored state during nonuse, and are caused to project inward of the frame to be put in use state during use.

Advantageous Effects of Invention

The pet toilet of the present invention is sanitary and is excellent in portability.

BRIEF DESCRIPTION OF DRAWINGS

FIGS. 14(a) to 14(c) are views showing another example of the frame of the pet toilet of the present invention, respectively, FIG. 14(a) being a bottom view of the frame, and FIGS. 14(b) and 14(c) being side views of the frame, respectively.

DESCRIPTION OF EMBODIMENTS

The present invention relates to a pet toilet which is sanitary and excellent in portability.

Figure 1:
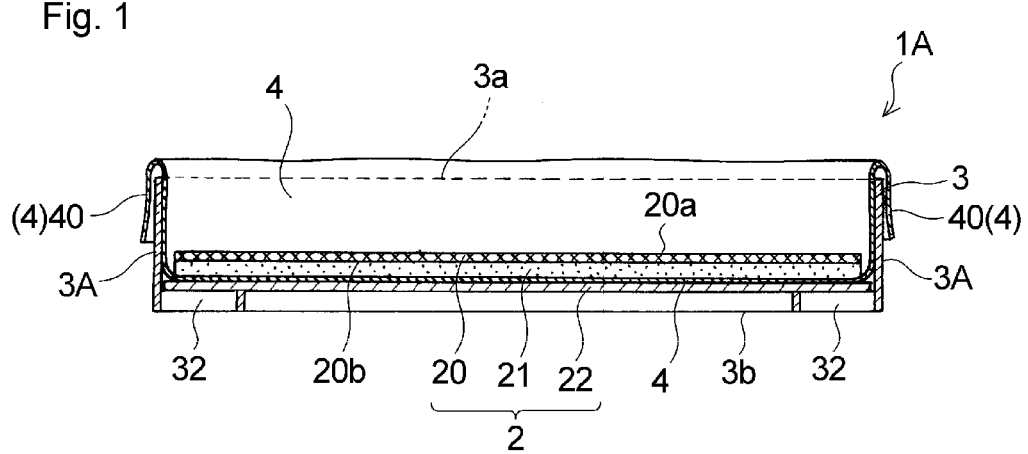
FIG. 1 is a sectional view schematically showing a section of a first embodiment of a pet toilet of the present invention in a use state, taken along a longitudinal direction of the embodiment.
Figure 2:
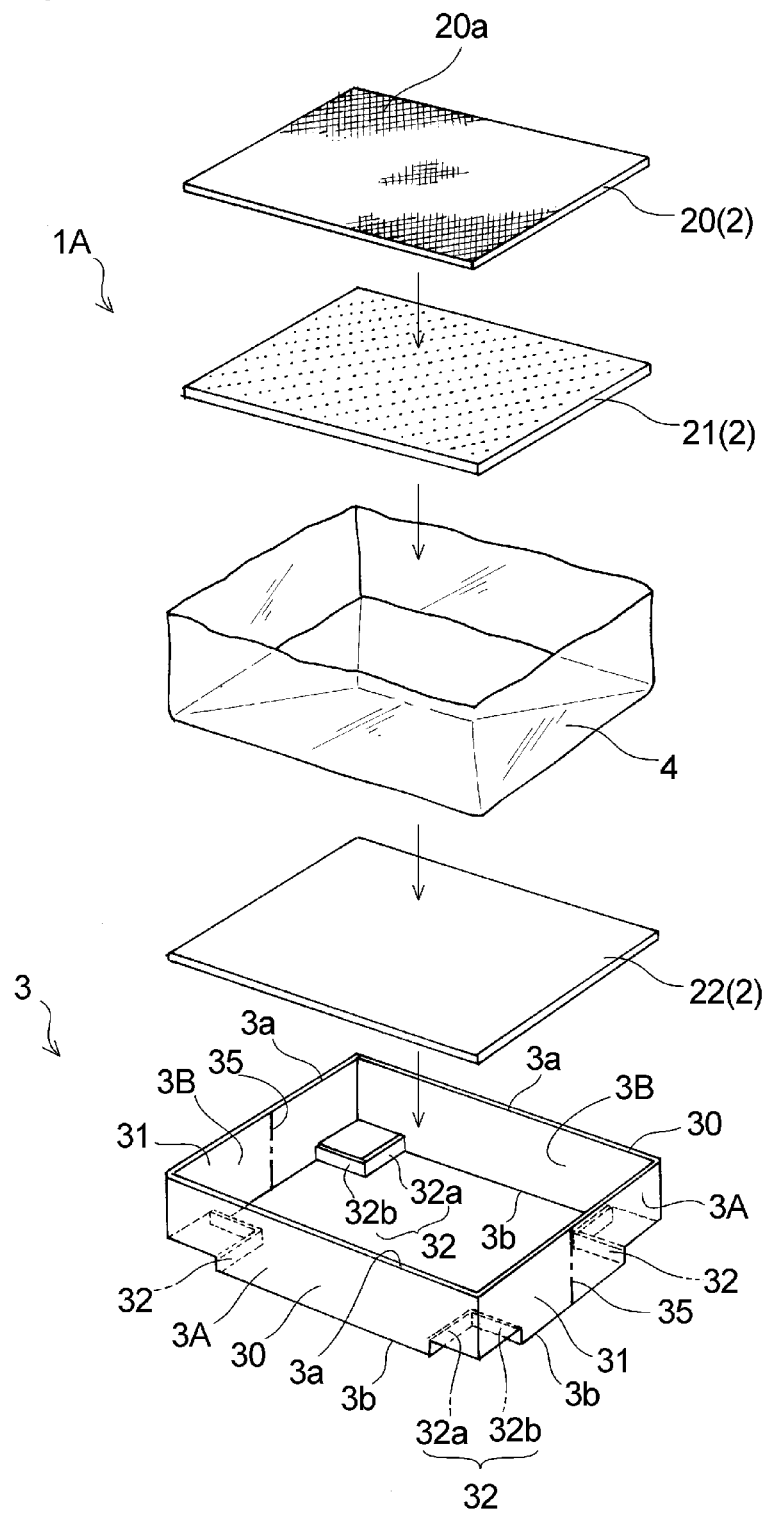
FIG. 2 is a schematic exploded perspective view of the pet toilet shown in FIG. 1.

A pet toilet of the present invention will be described below based upon preferred embodiments thereof with reference to the drawings. A pet toilet 1A of a first embodiment is provided with a footing-constituting member 2 constituting a footing for a pet (a small animal) such as a cat or a dog conducting an excreting action, and a frame 3 surrounding the footing-constituting member 2 and is rectangular in a plan view, as shown in FIG. 1 and FIG. 2. The shape of the footing-constituting member 2 (each member constituting the footing-constituting member 2 and described later) is the same as the shape of inside of the frame 3 (a rectangular shape in a plan view) and the size thereof is equal to or slightly smaller than the shape of the inside of the frame 3.

The footing-constituting member 2 in the first embodiment is configured to include a drainboard (Sunoko) 20 through which excretion (urine or the like) of a pet can pass, a liquid-retainable absorbent member 21 disposed below the drainboard 20, and a bottom plate 22 disposed below the absorbent member 21.

The drainboard 20 has a shape which is rectangular in a plan view and is flat, and has an upper face 20a positioned on a side closer to the pet during use of the toilet and a lower face 20a positioned opposite to the upper face 20a and positioned on a side farther from the pet during use of the toilet. The drainboard 20 has a lot of through-holes (not shown) penetrating the drainboard 20 in a thickness direction thereof, and the through-hole functions as a liquid-penetration hole which allows liquid on the upper face 20a to go through toward the lower face 20b. A lot of the through-holes are substantially uniformly arranged on the whole area of the drainboard 20. The drainboard 20 is disposed on a side closer to a pet than the absorbent member 21, so that it functions as a defensive part for preventing the pet from playing tricks on the absorbent member 21 and protecting the absorbent member 21 physically.

The drainboard 20, for example, includes a frame rectangular in a plan view, a plurality of first ribs arranged within the frame and extending in one direction, and a plurality of second ribs arranged within the frame and extending in a direction intersecting the respective first ribs, wherein a plurality of the through-holes are formed around intersection points of the first ribs and the second ribs. In the drainboard 20 thus configured, the through-holes are not provided in the frame, so that the frame has a practically sufficient strength and is useful for securing the strength of the drainboard 20. Formation materials of the drainboard 20 are not restricted particularly, if they have corrosion-resistance. In view of such a point that the drainboard is light-weight, it is easy to handle, it has formability, and the like, the drainboard is integrally molded from such a general synthetic resin as polypropylene, polyethylene, polyethylene terephthalate, vinyl chloride, acrylonitrile-butadiene-styrene copolymer (ABS), or the like. Further, a resin whose surface has been subjected to water repellent finishing or antibacterial finishing can also be suitably used as the formation material of the drainboard 20.

As the absorbent member 21, one which can absorb/retain excretion such as urine can be used without specific restrictions in this an. The absorbent member 21 is one obtained by forming, in a flat plate or sheet shape, a material including at least one of components such as pulp fibers, clay mineral-based material, polymeric absorbing material, and the like.

The bottom plate 22 is a flat plate-shaped member constituting a bottom portion of the footing-constituting member 2, and it supports the absorbent member 21 from a lower side of the absorbent member 21. The bottom plate 22 is disposed so that even if the absorbent member 21 is one having a strength which cannot endure a load when a pet has ridden on the footing-constituting member 2 the drainboard 20) (during use of the toilet) (for example, a thin sheet-like absorbent member), the absorbent member 21 is hard to deflect so that a footing for a pet can be provided stably. As the formation material of the bottom plate 22, one similar to the formation material for the drainboard 20 can be used.

In the first embodiment, the drainboard 20 and the absorbent member 21 are stored in a cylindrical water-proof bag 4 having a bottom, and upper end of the water-proof bag 4 is opened as an opening portion. As shown in FIG. 1, the waterproof bag 4 is arranged in such a manner that a bottom portion side thereof is stored in the frame 3, an upper end portion side thereof extends outwardly from an upper end 3a of the frame 3, and an extension portion 40 thereof is folded back to the side of an outer circumferential face 3A of the frame 3. A bottom portion of the waterproof bag 4 is sandwiched between the absorbent member 21 and the bottom plate 22. Since the absorbent member 21 is stored in the waterproof bag 4 in this manner, leakage of excretion absorbed and held in the absorbent member 21 to the outside can be prevented effectively. Further, at a discarding time of the absorbent member 21, while the extension portion 40 of the waterproof bag 4 is grasped by a hand of a user, the excretion together with the waterproof bag 4 can be discarded without touching the absorbent member 21 by a hand of the user directly, so that the treatment of the excretion can be performed in a sanitary manner. As the waterproof bag 4, one formed of a sheet which does not have a dipping property can be used, and as the sheet, for example, one formed of a synthetic resin such as polyethylene, polypropylene, polyester, polyamide, or the like, a water-repellent paper, a waterproof cloth, or the like can be used.

The frame 3 is composed of a set of long sides 30 and 30 opposite to each other and a set of short sides 31 and 31 opposite to each other, and has an opening which is rectangular in a plan view and penetrates in a vertical direction at a central portion thereof. The opening has a cylindrical shape surrounded by these four sides 30 and 31. These four sides 30 and 31 are each composed of a flat plate, and the frame 3 is provided with two sets of the flat plates opposite to each other. These four sides 30 and 31 are each parallel with another in a vertical direction (a vertical direction in FIG. 1), and the diameter of an opening surrounded by these four sides 30 and 31 is constant from the upper end 3a of the frame 3 toward a lower end 3b thereof. The outer circumferential face 3A of the frame 3 is formed of each outer face of the four sides 30 and 31, and an inner circumferential face 3B of the frame 3 is formed of each inner face of the four sides 30 and 31.

The frame 3 is provided with supporting bodies 32 projecting from the inner circumferential faces 3B toward the inside of the frame 3, and the footing-constituting member 2 (the drainboard 20, the absorbent member 21, and the bottom plate 22) is supported by the supporting bodies 32 from a lower side of the footing-constituting member 2, as shown in FIG. 1. In the first embodiment, as shown in FIG. 2, the supporting bodies 32 are provided at lower end portions of four corners within the frame 3, and respective upper ends of these four supporting bodies 32 come in contact with the bottom portion (the bottom plate 22) of the footing-constituting member 2. These four supporting bodies 32 are each composed of a rectangular projecting portion 32a and a rectangular projecting portion 32b. The rectangular projecting portion 32a projects from the inner face of the long side 30 toward the inside of the frame 3 and is approximately perpendicular to the inner face of the long side 30. The rectangular projecting portion 32b projects from the inner face of the short side 31 toward the inside of the frame 3 and is approximately perpendicular to the inner face of the short side 31. Both the projecting portions 32a and 32b are configured to be connected to each other at distal end portions in their projecting directions.

Figure 3:
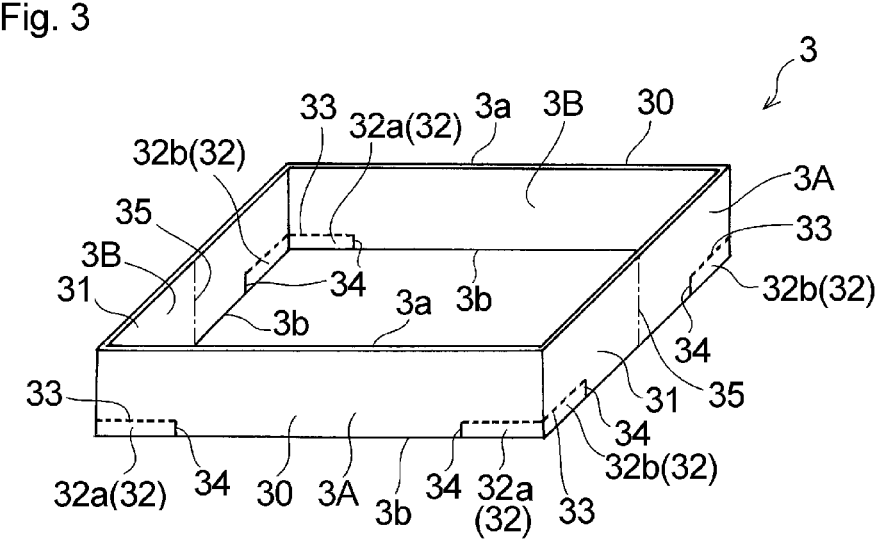
FIG. 3 is a perspective view of a frame put in a developed state of the pet toilet shown in FIG. 1.

The supporting bodies 32 are composed of portions of the sides 30 and 31 constituting the frame 3, and they are disposed to be approximately flush with the inner circumferential faces 3B to be put in their stored states without projecting from the inner circumferential faces 3B of the frame 3 during nonuse of the pet toilet, as shown in FIG. 3, and they are caused to project inward of the frame 3 to be put in a use state, as shown in FIG. 1 and FIG. 2. In further explanation, four straight scores 33 bridging corner portions (sides where two flat plates intersect each other constituting the frame 3) to extend in a circumferential direction of the frame 3 [a direction perpendicular to a height direction of the frame 3 (a widthwise direction of the side)] are provided in the frame 3, and a portion positioned from each score 33 on the side of the lower end 3b constitutes the supporting body 32 composed of the projecting portions 32a and 33b. Then, when the supporting bodies 32 (the projecting portions 32a and 32b) in the stored states shown in FIG. 3 are pushed inward of the frame 3, the supporting bodies 32 pushed in project inward of the frame 2 while two straight bend lines connecting both end portions of the score 33 in the lengthwise direction thereof with a lower end 3b of the frame 3 positioned below both the end portions are utilized as starting points, thereby reaching the use state shown in FIG. 1 and FIG. 2. Furthermore, when the supporting bodies 32 in the use state are pushed outward of the frame 3, the stored state shown in FIG. 3 is obtained again. It is to be noted that the score 33 is configured in such a manner that a break continues over a whole length in the longitudinal direction thereof, but instead of such a break, a cutoff line composed of a plurality of breaks formed in a perforation manner can be adopted.

Figure 4:
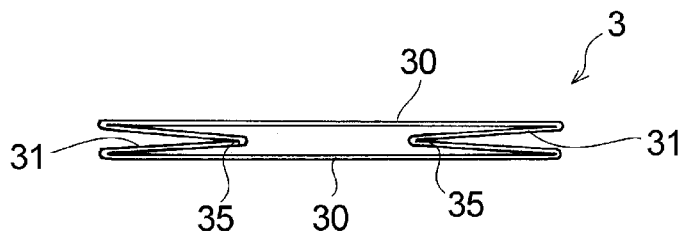
FIG. 4 is a plan view showing the frame shown in FIG. 3 in a folded state.

The frame 3 is configured so as to be foldable by folding one set of opposite sides of two sets of opposite sides constituting the frame 3 in such a manner that lengthwise central portions of the one set of opposite sides constituting the frame 3 are directed inward of the frame. That is, the frame 3 is provided with two sets of opposite flat plates, and it is configured so as to be foldable by folding one set of opposed flat plates of the two sets of opposite flat plates in such a manner that horizontal central portions of the one set of flat plates are directed inward of the frame. In the first embodiment, as shown in FIG. 2 and FIG. 3, at central portions of one set of opposite short sides 31 and 31 in the lengthwise directions thereof, straight valley fold lines 35 extending in widthwise directions perpendicular to the lengthwise directions are formed, and the frame 3 can be folded by performing valley folds at the valley fold lines 35, as shown in FIG. 4. Further, in the frame 3 in the folded state shown in FIG. 4, when the respective valley fold lines 35 of the one set of short sides 31 and 31 are pushed outward of the frame 3, the developed state shown in FIG. 3 is obtained again.

As the formation material of the frame 3, ones having an appropriate strength, and making it possible to perform projecting or storing operation of the above-described supporting bodies 32 (projecting portions 32a and 32b) and folding operations of the sides constituting the frame 3 are suitably used, and for example, a paper board such as a cardboard or a corrugated board, a thin plate such as one made of synthetic resin, a plastic corrugated board, or the like can be used. In particular, since the plastic corrugated board makes it possible to weight-reduce the frame while maintaining the strength required as a structural body, it is suitably used in this invention. The frame 3 is not required to have a water-resistant property necessarily, and therefore the formation material thereof need not have a water resistance.

The size of the frame 3 is not limited particularly, and it can be designed in conformity with the size of a pet using the toilet 1A. In the frame 3, for example, the length of the long side 30 is in a range from 200 to 800 mm, the length of the short side 31 is in a range from 100 to 500 mm, and the height (the lengths in the widthwise directions of the sides 30 and 31) is in a range from 10 to 200 nm. Regarding the height of the frame, in addition to setting the whole frame to such a height that a pot steps over the frame, for example, a height region making the pet easy to enter the toilet can be provided like a frame 37 shown in FIG. 12 and FIG. 13 by performing such a process as partially cutting the long side 30 or the short side 31 of the frame in the height direction. Incidentally, the dimension of each portion of the frame 3 shown here is an inside dimension (inside dimension of the inside of the frame 3).

A use method of the pet toilet 1A of the first embodiment (is provided with a footing-constituting member 2 constituting a footing of a pet conducting an excreting action and a frame 3 surrounding the footing-constituting member 2 and rectangular in a plan view, the frame 3 being provided with two sets of opposite flat plates (sides 30 and 31) and being configured so as to be foldable by folding one set of flat plates of the two sets of flat plates (sides 30 and 31) in such a manner that their central portions in the horizontal direction are directed inward of the frame 3, the footing-constituting member 2 being supported by the supporting bodies 32, from a lower side thereof, projecting from inner circumferential faces 3B of the frame 3 inward of the frame 3, and the supporting bodies 32 being composed of portions of the flat plates (sides 30 and 31)) will be described. The use method includes a step of developing the frame 3 in a folded state; a step of causing supporting bodies 32 disposed to be approximately flush with the inner circumferential faces 3B of the developed frame 3 and being put in a stored state to project from the inner circumferential faces 3B of the frame 3 toward the inside of the frame 3; and a step of placing the footing-constituting member 2 (the drainboard 20, the absorbent member 21, and the bottom plate 22) on the projected supporting bodies 32.

In further explanation, in order to use the pet toilet 1A of the first embodiment, first, the frame 3 in the folded state shown in FIG. 4 is put in the developed state shown in FIG. 3 by spreading in the folded state with a hand of a user or the like and the use state shown in FIG. 2 is then obtained by pushing the four supporting bodies 32 put in the stored state in the developed state of the frame 3 toward the inside of the frame 3 to cause them to project, respectively. As shown in FIG. 2, the bottom plate 22 is placed on the four supporting bodies 32 in the use state, and the absorbent member 21 and the drainboard 20 stored in the water-resistant bag 4 is further placed on the bottom plate 22 together with the water-resistant bag 4, portions (extension portions 40) of the water-resistant bag 4 placed on the bottom plate 22, which project from the frame 3 are folded back to the side of the outer circumferential faces 3A of the frame 3, thereby completing the pet toilet 1A shown in FIG. 1.

A pet conducts an excreting action on the drainboard 20. The excretion such as urine which the pet has excreted goes through the liquid permeable drainboard 20, and is absorbed and held in the absorbent member 21. The pet toilet 1A of the first embodiment can be used as a toilet for such a small animal as a cat, a dog, a rabbit, or a hamster and it is particularly suitable as a toilet for a dog.

According to the pet toilet 1A of the first embodiment, since the absorbent member 21 absorbing and holding excretion of a pet is supported by the supporting bodies 32 provided on the inner circumferential faces 3B of the frame 3 in a projecting manner from a lower side of the absorbent member 21 during use, thereby preventing the absorbent member 21 from coming in contact with a placement face (a floor face or the like), smell of the excretion is hard to transfer to the placement face. Further, since the toilet 1A is hard to be affected by a state of the placement face, excretion can be absorbed evenly by arranging the bottom plate 22 which can maintain flatness like the first embodiment, and when the toilet 1A is moved while being in the use state, even if the frame 3 is picked up by both hands of a user, the excretion can be moved while it is kept sanitary. Further, since the toilet 1A can be compacted by arranging the inner circumferential faces 3B to be approximately flush with the supporting bodies 32 put in the projecting state from the inner circumferential faces 3B of the frame 3 to put them in the stored state and folding the frame 3 in the nonuse state, the toilet 1A is excellent in portability.

Figure 5:
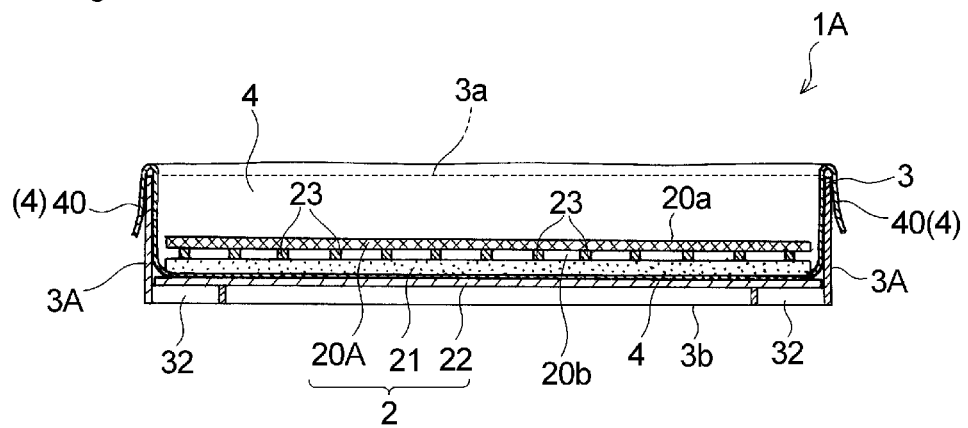
FIG. 5 is a view of a modified example of the pet toilet of the first embodiment shown in FIG. 1 and corresponding to FIG. 1.

In FIG. 5, in the pet toilet 1A of the first embodiment, an example where a drainboard 20A is adopted instead of the above-descried drainboard 20 is shown. The drainboard 20A has a plurality of projection portions 23 on a lower face 20b thereof, and comes in contact with the absorbent member 21 at the plurality of projection portions 23. The plurality of projection portions 23 are arranged uniformly on an approximately whole area of the lower face 20b, and the heights of the respective projection portions 23 are the same. Arrangement of the projection portions 23 is not limited particularly, but for example, when the drainboard 20A is configured to include a frame, and first ribs and second ribs, as described above, the projection portions 23 can be formed at intersecting points of the first ribs and the second ribs. Thus, by adopting the drainboard 20A having projection portions and recessed portions on the lower face 20b which is a face opposite to the absorbent member 21, the absorbent member 21 is physically protected, and in addition thereto, since an upper face 20a of the drainboard 20A with which foots of a pet come in direct contact is separated from the absorbent member 21 due to existence of the projection portions 23, when the absorbent member 21 is in a wet state due to that it absorbs and holds excretion, the foot(s) of the pet is effectively prevented from touching the absorbent member 21 in the wet state to get wet, so that the toilet 1A can be used in a more sanitary manner. From such a viewpoint that the function and effect obtained by the projection portions 23 can be securely achieved, the heights of the projection portions 23 are preferably in a range from 5 to 50 mm, more preferably in a range from 10 to 20 mm.

Next, other embodiments of the pet toilet of the present invention will be described. Regarding the other embodiments described later, constituent portions different from those of the above-described first embodiment will be described mainly, and explanation about constituent portions similar to those of the first embodiment is omitted with attachment of similar reference numerals. Explanations in the first embodiment are properly applied to constituent portions which are not described particularly.

Figure 6:
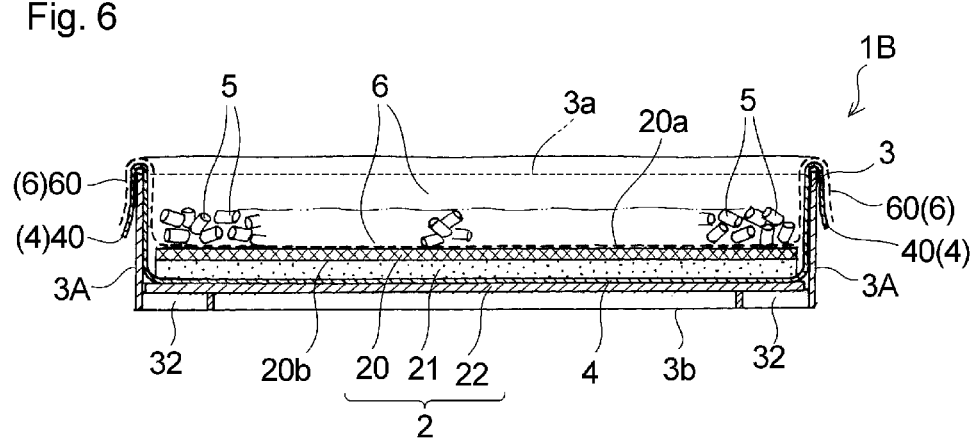
FIG. 6 is a sectional view schematically showing a section of a second embodiment of the pet toilet of the present invention in a use state, taken along a longitudinal direction of the second embodiment.

In FIG. 6, a second embodiment of the pet toilet of the present invention is shown. In a pet toilet 1B of the second embodiment, as shown in FIG. 6, an excretion treatment layer is formed on the upper two 20a of the drainboard 20 by loading a proper amount of excretion treatment material 5 on the upper face 20a of the drainboard 20. The excretion treatment material 5 is stored in the cylindrical liquid-permeable bag 6 having a bottom. An upper end of the liquid-permeable bag 6 is opened as an opening portion. The liquid-permeable bag 6 is configured in such a manner that a bottom portion side of the liquid-permeable bag 6 is stored in the frame 3, upper end sides of the liquid-permeable bag 6 extend outwardly from an upper end 30A of the frame 3, and extension portions 60 of the liquid-permeable bag 6 are folded back to the side of the outer circumferential faces 3A of the frame 3. The extension portions 60 of the liquid-permeable bag 6 are caused to overlap with the extension portions 40 of the waterproof bag 4, as shown in FIG. 6. The bottom portion of the liquid-permeable bag 6 is sandwiched between the excretion treatment layer and the drainboard 20.

As the excretion treatment material 5, for example, a granulated excretion treatment material used as cat litter, toilet sand, or the like in this art can be used without being limited particularly. The excretion treatment material 5 is preferably a formed material which includes at least one ingredient selected from a group of ground product of a plant-derived material, a synthetic resin, clay mineral, and the like, and is obtained by forming the ingredient. The shape of the excretion treatment material 5 may be, for example, a cylindrical shape, a spherical shape, a cubic shape, a rectangular parallelepiped and the like.

As the liquid-permeable bag 6, for example, one obtained by forming many liquid penetration holes having opening diameters smaller than diameters of particles of the excretion treatment material 5 in a bag formed of a sheet which does not have liquid penetration like a waterproof bag 4 can be used. In the liquid-permeable bag 6, it is only necessary for at least a bottom portion thereof (a portion coming in contact with the lower portion of the excretion treatment layer) to have liquid penetration, and therefore the liquid penetration holes may be formed in at least the bottom portion of the liquid-permeable bag 6 but they may be formed on the whole area of the liquid-permeable bag 6.

In the pet toilet 1B of the second embodiment, a pet conducts an excreting action on the excretion treatment layer. The pet toilet 1B is suitable as a toilet for such a small animal having a habit which stirs an excretion treatment material after excretion, such as a cat. Even in the second embodiment, an effect similar to that of the first embodiment can be achieved. In particular, since the excretion treatment material 5 is stored in the liquid-permeable bag 6, the liquid-permeable bag 6 can be discarded in a discarding time of the liquid-permeable bag 6 by grasping the extension portions 60 of the liquid-permeable bag 6 without a user directly touching the excretion treatment material 5 with his/her hand, so that the discarding treatment can be performed in a sanitary manner.

Figure 7:
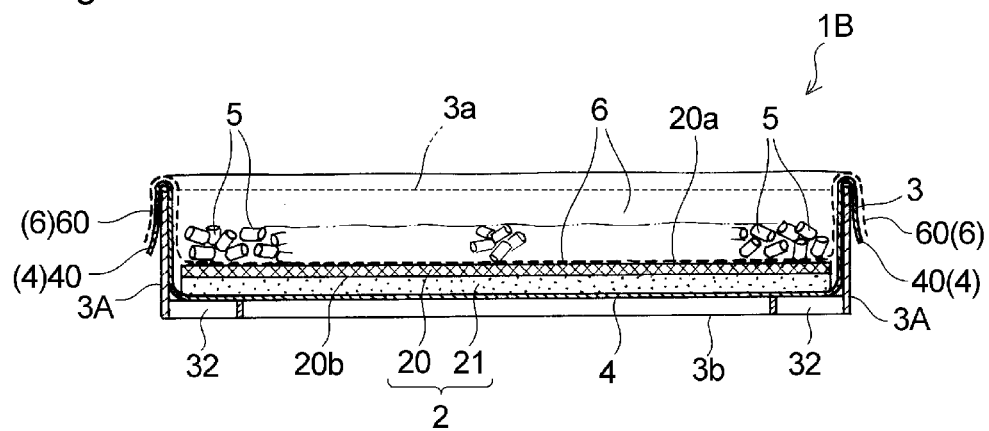
FIG. 7 is a view of a modified example of the pet toilet of the second embodiment shown in FIG. 6 and corresponding to FIG. 6.

In the pet toilet 1B of the second embodiment, as shown in FIG. 7, the footing-constituting member 2 can be constituted by utilizing the drainboard 20 and the absorbent member 21 without using the bottom plate 22, were the pet toilet is further compacted and reduced in weight. However, when the bottom plate 22 is not used, as the absorbent member 21, one which has a relatively high strength which can endure a load when a pet has ridden on the footing-constituting member 2 (the drainboard 20) (during use of the toilet) is preferably used, and it is desirable to avoid use of a thin sheet-like absorbent member.

Figure 8:
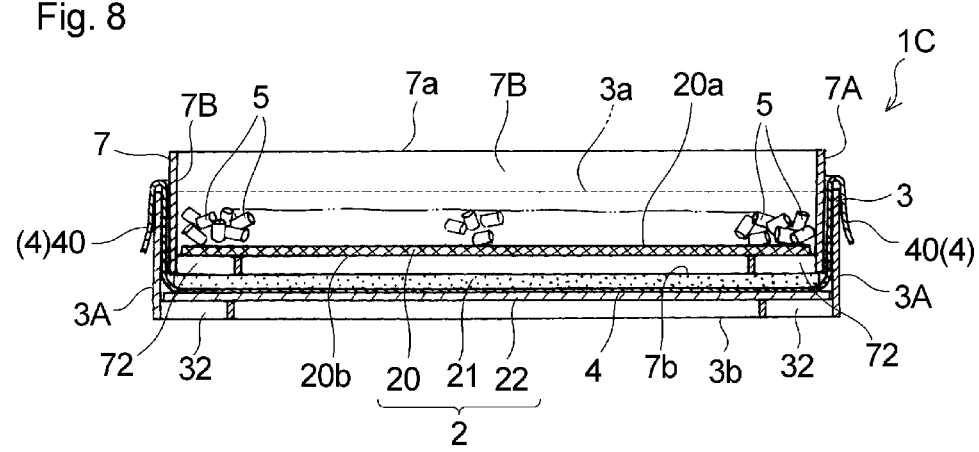
FIG. 8 is a sectional view schematically showing a section of a third embodiment of the pet toilet of the present invention in a use state, taken along a longitudinal direction of the third embodiment.

In FIG. 8, a third embodiment of the pet toilet of the present invention is shown. In a pet toilet 1C of the third embodiment, the excretion treatment material 5 (the excretion treatment layer) is stored in a treatment material case instead of storing the excretion treatment material 5 in the liquid-permeable bag 6, as the second embodiment. That is, in the pet toilet 1C, as shown in FIG. 8, the excretion treatment layer is formed by loading a proper amount of excretion treatment material 5 on the upper face 20a of the drainboard 20, and the excretion treatment material 5 along with the drainboard 20 is stored in the treatment material case put on the absorbent member 21.

The treatment material case is composed of a small frame 7 which has a size storable in the frame 3, is rectangular in a plan view, and surrounds the drainboard 20. The small frame 7 is configured so as to be similar to the frame 3 except that the former is smaller in size than the latter, and the small frame 7 is foldable. The frame 3 and the small frame 7 are in a similar relationship in shape in a plan view, and a similarity ratio of the small frame 7 to the frame 3 is less than 1.

Figure 9:
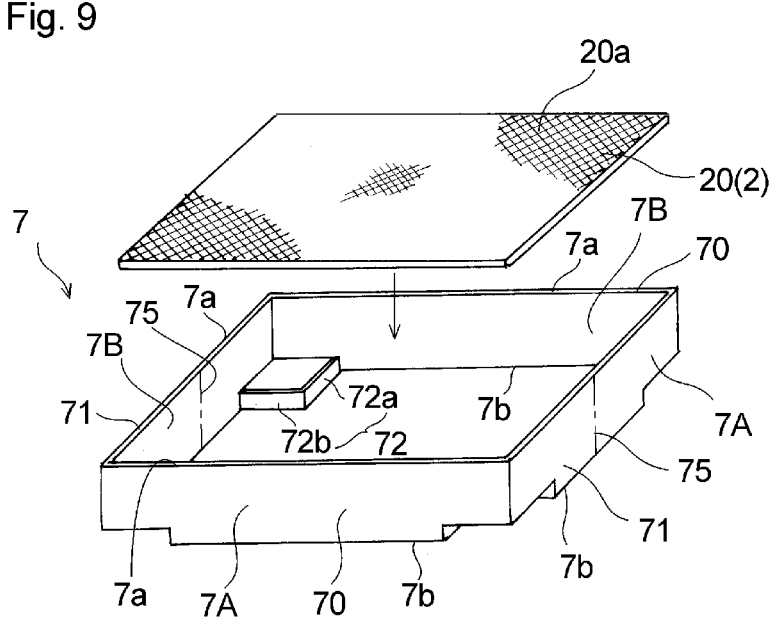
FIG. 9 is a perspective view showing a treatment material storing case (a small frame) and a dry in a developed state of the pet toilet shown in FIG. 8.

In further explanation, the small frame 7 (the treatment material storing case) is composed of a set of long sides 70 and 70 opposite to each other and a set of short sides 71 and 71 opposite to each other, as shown in FIG. 8 and FIG. 9, and has an opening which is rectangular in a plan view and whose central portion penetrates in a vertical direction, and the opening is surrounded by these four sides 70 and 71, so that the small frame 7 has a cylindrical shape. These four sides 70 and 71 are each composed of a flat plate, and the small frame 7 is provided with two sets of the flat plates opposite to each other. These four sides 70 and 71 are parallel with each other in a vertical direction (a vertical direction in FIG. 8), respectively, and the diameter of the opening surrounded by these roar sides 70 and 71 is constant from an upper end 7a of the small frame 7 toward a lower end 7b thereof. Circumferential faces 7A of the small frame 7 are formed of respective outer faces of the four sides 70 and 71, and inner circumferential faces 7B of the small frame 7 are formed of respective inner faces of the four sides 70 and 71.

The small frame 7 (the treatment material storing case) is provided with supporting bodies 72 projecting from the inner circumferential faces 7B toward the inside of the small frame 7, and the drainboard 20 which is one of the footing-constituting member 2 is supported by the supporting bodies 72 from a lower side thereof as shown in FIG. 8. In the third embodiment, the supporting bodies 72 are provided at lower end portions of four corners within the small frame 7 like the frame 3, and each of these four supporting bodies 72 and the drainboard 20 are in contact with each other. The four supporting bodies 72 are each composed of a rectangular projecting portion 72a and a rectangular projecting portion 72b. The rectangular projecting portion 72a projects from the inner faces of the long sides 70 toward the inside of the small frame 7 and is approximately perpendicular to the inner faces of the long sides 70. The rectangular projecting portion 72b projects from the inner faces of the short sides 71 toward the inside of the small frame 7 and is approximately perpendicular to the inner faces of the short sides 71. Both the projecting portions 72a and 72b are configured to be connected to each other at their distal end portions in the projecting directions.

The supporting bodies 72 are composed of portions of the sides 70 and 71 constituting the small frame 7 (the treatment material storing case), and they are arranged to be approximately flush with the inner circumferential faces 7B to be put in a stored state during nonuse without projecting from the inner circumferential faces 7B of the small frame 7, while they are caused to project inward of the small frame 7 to be put in a use state during use, as shown in FIG. 8 and FIG. 9 during use. A specific configuration of the supporting body 72 of the small frame 7 is the same as the supporting body 32 of the frame 3.

The small frame 7 (the treatment material storing case) is configured so as to be foldable by folding one set of opposite sides of two sets of opposite sides constituting the small frame 7 in such a manner that lengthwise central portions of the one set of opposite sides constituting the small frame 7 are directed inward of the frame. That is, the small frame 7 is provided with two sets of opposite flat plates, and is configured so as to be foldable by folding one set of opposed flat plates of the two sets of opposite flat plates in such a manner that horizontal central portions of the one set of flat plates are directed inward of the frame. In the third embodiment, as shown in FIG. 9, at lengthwise central portions of one set of opposite short sides 71 and 71, straight valley fold lines 75 extending in widthwise directions perpendicular to the lengthwise directions are formed, and the small frame 7 can be folded in the same manner as the frame 3 shown in FIG. 4 by performing valley folds at the valley fold lines 75, and the small frame 7 in the folded state can be easily returned to the developed state shown in FIG. 9.

As the formation material of the small frame 7 (the treatment material storing case), a material similar to the formation material of the frame 3 can be used basically, but it is preferable that the small frame 7 has water resistance in view of such a function as storing the excretion treatment material 5, and therefore, it is preferable that the formation material has water resistance. As examples suitable as the formation material of the small frame 7 having a water resistance, a thin plate made of synthetic resin or the like, a plastic corrugated board sheet, and the like are involved. In particular, since the plastic corrugated board sheet can reduce the small frame in weight easily while maintaining strength required as the structural body, it can be suitably used in the present invention.

The size of the small frame 7 (the treatment material storing case) is not limited particularly, and it can be designed in conformity with the size of a pet using the toilet 1C. The small frame 7 is set, for example, in such a manner that the long side 70 is in a range from 190 to 798 mm, the short side 71 is in a range from 90 to 498 mm, and the height (the lengths of the sides 70 and 71 in the widthwise direction) is in a range from 10 to 300 mm. Regarding the height of the small frame, in addition to that it is set that a pet can step over the whole of the small frame to enter the small frame, for example, as the frame 37 shown in FIG. 12 and FIG. 13, a height region through which a pet advances to the small frame easily can be provided at a portion of the small frame by performing such a process as partially cut off a portion of the long side 70 or the small side 71 of the small frame. It is to be noted that the size of each portion of the small frame 7 shown here is equal to an inner size (the size of inside of the small frame 7).

In the pet toilet 1C of the third embodiment, a pet enters the treatment material storing case (the small frame 7) to conduct an excreting action on the excretion treatment layer. The pet toilet 1C is suitable as a toilet for a small animal having a habit which stirs an excretion treatment material after excretion, such as a cat, and achieves an effect similar to that of the second embodiment. In particular, since the excretion treatment material 5 is stored in the treatment material storing case, replacement or discarding of the excretion treatment material 5 can be perforated in a sanitary manner at a replacing or discarding time of the excretion treatment material 5 by taking up the treatment material storing case without a user directly touching the excretion treatment material 5 with his/her hand, and simultaneously therewith, replacement or discarding of the absorbent member 21 which has been stored in the frame 3 can be performed. Further, since the treatment material storing case is foldable like the frame 3, the toilet 1C can be compacted during nonuse and it is excellent in portability.

Figure 10:
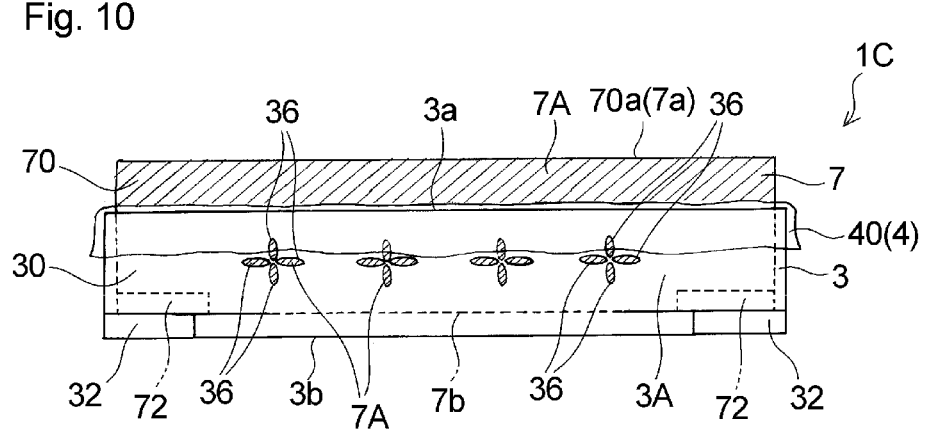
FIG. 10 is a side view of a modified example of the pet toilet of the third embodiment shown in FIG. 8.
Figure 11:
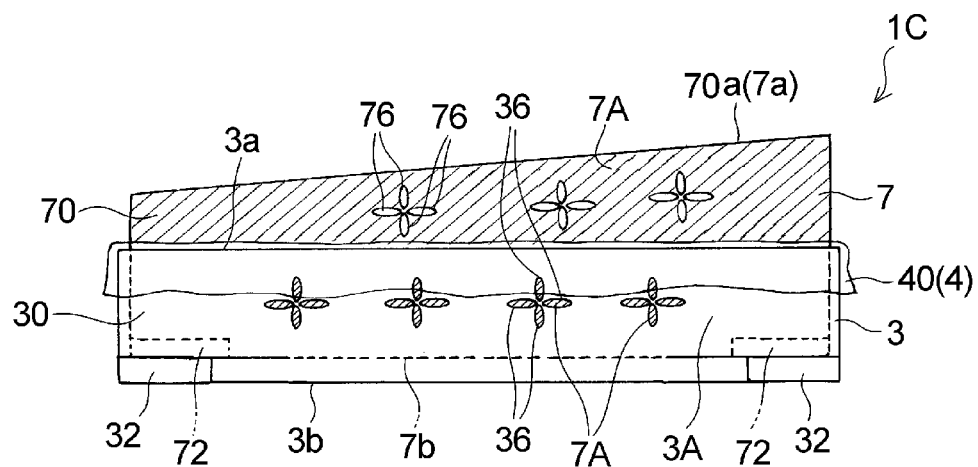
FIG. 11 is a side view of another modified example of the pet toilet of the third embodiment shown in FIG. 8.

In the pet toilet 1C of the third embodiment, as shown in FIG. 10 and FIG. 11, in view of improvement of design, the outer circumferential faces 3A and 7A of the frame 3 and the small frame 7 (the treatment material storing case) may be made different from each other in color, and patterns may be provided on the outer circumferential faces 3A and 7A. Further, from a viewpoint similar to the above, at least one of the frame 3 and the small frame 7 may have, at at least one side of the four sides constituting the frame 3 or the small frame 7, a punched portion having a predetermined shape and penetrating the one side in the thickness direction.

In the pet toilet 1C shown in FIG. 10, four patterns composed of four oval-shaped punched portions 36 are formed on the long side 30 constituting the frame 3, and the outer circumferential faces 7A of the small frame 7 can be viewed via each punched portion 36. By making the outer circumferential faces 3A and 7B of the frame 3 and the small frame 7 stored in the frame 3 different in color in this manner, and forming the punched portions 36 in the frame 3, the design of the pet toilet can be further improved. The shape and the number of punched portions 36 may be set arbitrarily, and the punched portion 36 may be formed in an arbitrary side of the four sides 30 and 31 constituting the frame 3.

In the pet toilet 1C shown in FIG. 11, four patterns composed of the four oval-shaped punched portions 36 are formed on the long side 30 constituting the frame 3, so that the outer circumferential faces 7A of the small frame 7 can be viewed through each punched portion 36, and three patterns composed of four oval-shaped punched portions 76 are also formed in the long side 70 constituting the small frame 7, which results in improvement in design. The shape and the number of punched portions 76 may be set arbitrarily, and the punched portion 76 may be formed in an arbitrary side of the tour sides 70 and 71 constituting the small frame 7.

Further, in the pet toilet 1C shown in FIG. 11, a set of long sides 70 and 70 constituting the small frame 7 each have a length in a widthwise direction perpendicular to the lengthwise direction thereof (a vertical direction in FIG. 1) which is not constant, where one end thereof and the other end thereof are different in length from each other, so that a upper end 70a of the long side 70 forming the upper end 7a of the small frame 7 is inclined in a side view of the toilet 1C such as shown in FIG. 11. That is, an upper end of the flat plate constituting the small frame 7 is inclined. As a result, one set of small sides 71 and 71 constituting the small frame 7 is set in such a manner that, though not illustrated, one ends thereof are wider than the other ends thereof so that one side face (for example, a front face) of the toilet 1C and the other side face opposite thereto (a rear face) are different in height of the small frame 7. With such a configuration, for example, when a cat takes such an action as stirring the excretion treatment material within the small frame 7 with its foot(s) after excretion, the excretion treatment material is effectively prevented from spattering to the outside. It is to be noted that in FIG. 1, the upper ends of the long sides 70 and 70 (the upper ends of the flat plates constituting the small frame 7) are inclined, but the upper ends of the short sides 71 and 71 may be inclined instead of the inclination of the long sides 70 and 70. Further, as the inclination shape of the upper end, a waveform, a streamline or the like can be adopted instead of the straight line in FIG. 11.

Figure 12:
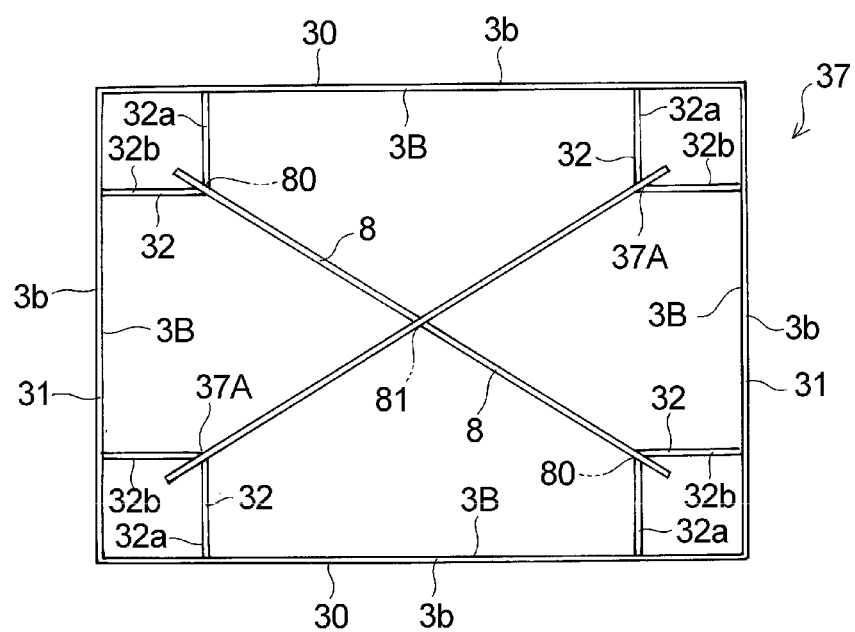
FIG. 12 is a bottom view of one example of the frame in the pet toilet of the present invention.
Figure 13:
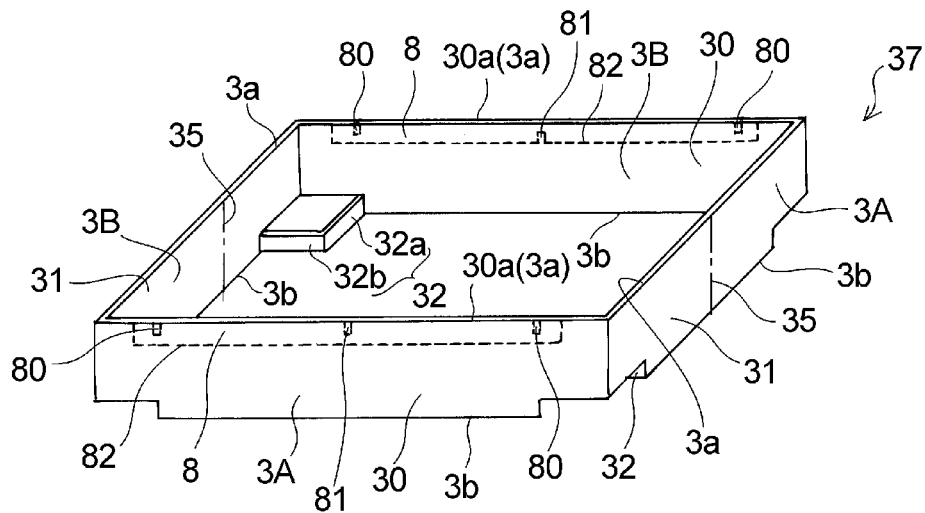
FIG. 13 is a perspective view of the frame shown in FIG. 12 in a state before used.

In FIG. 12 and FIG. 13, a frame 37 is shown as one example of the frame in the pet toilet of the present invention. The frame 37 is provided with two sets of sides 30 and 31 opposite to each other (two sets of flat plates). In the frame 37, as shown in FIG. 12, a frame reinforcing member 8 bridged between one set of supporting bodies 32 and 32 opposite to each other is arranged. Within the frame 37, two rectangular frame reinforcing members 8 are disposed in an orthogonal manner, the two frame reinforcing members 8 and 8 have the same shape and the same size, and the two frame reinforcing members 8 and 8 intersect each other at a center of the frame 37. The frame reinforcing member 8 is disposed below a footing-constituting member (not shown) during use.

The two frame reinforcing members 8 and 8 are each integrated with the long side 30 (the flat plate) to be put in a stored state during nonuse, as shown in FIG. 13, and they are each separated from the long side 30 (the flat plate) to be coupled to one set of supporting bodies 32 and 32 opposite to each other during use, as shown in FIG. 12. In farther explanation, in the frame 37 during nonuse, one set of long sides 30 and 30 constituting the frame 37 is each formed with a cutoff line 82 composed of a plurality of cuts formed in a perforation manner in the vicinity of the upper end 30a of the long side 30 forming the upper end 3*a* of the frame 37, and a portion surrounded by the cutoff line 82 constitutes the frame reinforcing member 8 in the stored state. That is, the cutoff lines 82 are formed in the vicinities of each of the upper end of one set of flat plates of two sets of flat plates constituting the frame 37, and the portions surrounded by the cutoff lines 82 constitute the frame reinforcing members 8 in the stored state. The frame reinforcing member 8 has, in a stored state, rectangular cutoff portions 80, which is used when the frame reinforcing member 8 is fitted to the supporting bodies 32, at both end portions in its lengthwise direction, and has, at a central portion thereof in the lengthwise direction, a rectangular cutoff portion 81 which is used when the frame reinforcing member 8 is fitted to another frame reinforcing member 8.

When the frame reinforcing member 8 in the stored state shown in FIG. 13 is grasped and pulled, the frame reinforcing member 8 is separated from the long side 30 along the cutoff line 82. By inserting one of two frame reinforcing member 8 and 8 thus separated into the frame 37 from an upper opening (the upper end 3*a*) and fitting the cutoff portions 80 and 80 at the both end portions to two supporting bodies 32 and 32 arranged in the orthogonal manner, the one of the frame reinforcing members 8 is coupled to the both supporting bodies 32 and 32 of the frame, and by fitting the cutoff portion 81 of the other frame reinforcing members 8 at the central portion to the cutoff portion 81 of the one frame reinforcing member 8 at the central portion and fitting the cutoff portions 80 and 80 at the both end portions to the other two supporting bodies 32 and 32, the one frame reinforcing member 8 and the other two supporting bodies 32 and 32 are coupled, which results in the state shown in FIG. 12. Regarding the four supporting members 32 and the two frame reinforcing members 8 and 8 thus coupled, upper ends thereof (portions on which the footing-constituting member is put) are flush with each other and lower ends thereof (portions coming in contact with a placement face of the pet toilet) are flush with each other. During use of the frame 37, one set of long sides 30 and 30 are each in a state where a portion (a portion where the frame reinforcing member 8 was present) of the upper end thereof is removed.

According to the frame 37 having such a configuration, it becomes possible to reinforce the frame easily without adding a material for frame reinforcement, and it becomes possible to elevate the strength of the frame and maintain the rectangular shape during use while achieving the weight reduction of the pet toilet.

Figures 14A, 14B:
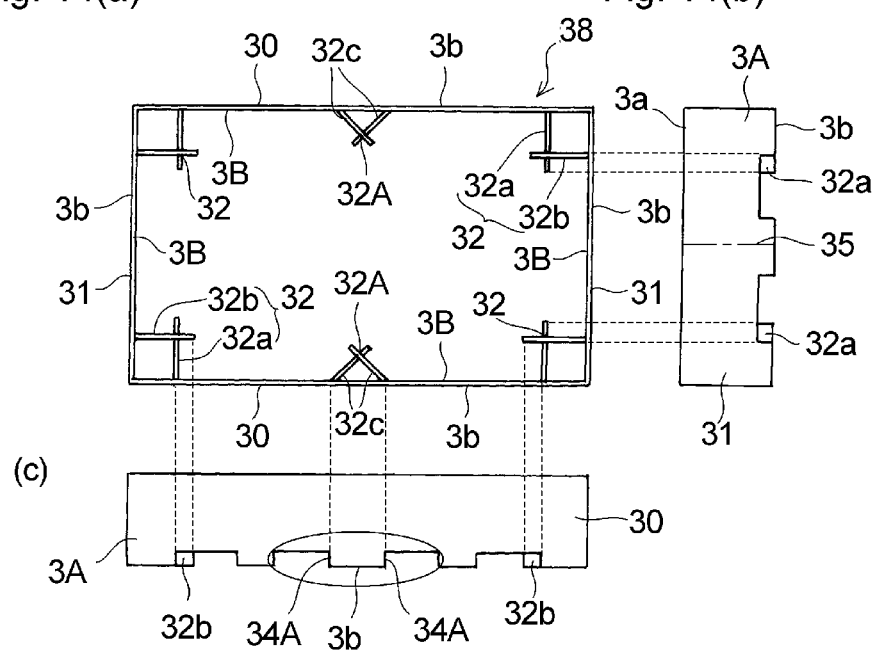

In FIG. 14, a frame 38 is shown as another example of the frame in the pet toilet of the present invention. The frame 38 is provided with two sets of sides 30 and 31 (two sets of flat plates) opposite to each other, and in addition to four supporting bodies 32 provided at lower end portions of four corners within the frame 38, it is further provided with two supporting bodies 32A provided at lower end portions of one set of long sides 30 and 30 constituting the frame 38 at central portions in the respective lengthwise directions. Each supporting body 32A is composed of two rectangular projecting portions 32*c* and 32*c* projecting from an inner face of the long side 30 toward the inside of the frame 3, and is formed in an approximately triangular shape in a plan view.

In the above-described frame 3, a plurality of projecting portions constituting each supporting body are always coupled to each other at their distal end portions in their projecting directions, and, therefore, are inseparable from each other. However, in the frame 38 shown in FIG. 14, the plurality of projecting portions constituting each supporting body are independent and are not coupled to each other during nonuse, respectively, and are coupled to each other by fitting cutoff portions provided in each projecting portion to each other. In FIG. 15, a state during nonuse of the supporting body 32A (the projecting portion 32*c*) and a state during use thereof are shown. FIG. 15(*a*) shows a state during nonuse of a portion of the supporting body surrounded by an oval shown in FIG. 14(*c*) (before coupling the projecting portions with each other).

The supporting body 32A is composed of a portion of the long side 30 constituting the frame 38, and during nonuse thereof, as shown in FIG. 15(*a*), it is arranged so as to be approximately flush with the inner circumferential face 3B to be put in a stored state without projecting from the inner circumferential face 3B of the frame 38, while during use, as shown in FIG. 14(*a*), the supporting body 32A is caused to project inward of the frame 38 to be put in a use state. In further explanation, one set of long sides 30 and 30 constituting the frame 38 are each formed with two approximately L-shaped scores 33A in the vicinity of the lower end 30*b* of the long side 30 forming the lower end 3*b* of the frame 38 (in the vicinity of each of one set of flat plates of two sets of the flat plates constituting the frame 38), a portion of the long sides 30 and 30 positioned closer to (below) the lower end 30*b* than each score 33A constitutes a projecting portion 32*c* pivotable inward of the flume 38, and a plurality of projecting portions 32*c* and 32*c* are coupled to each other so that the supporting body 32A is put in a use state, as described later. Each projecting portion 32*c* has a cutoff portion 39, which is used when the projecting portion 32*c* is fitted to another projecting portion 32*c*, at one end portion thereof in a lengthwise direction thereof (in the vicinity of a distal end portion in the projecting direction when the projecting portion is caused to project inward of the frame 38), in the stored state.

When the projecting portions 32*c* and 32*c* in the stored state shown in FIG. 15(*a*) are pushed inward of the frame 38, the pushed projecting portions 32*c* project inward of the frame 38 as starting points which are straight bend lines 34A connecting an end portion of the long side 30 nearer to the center in the lengthwise direction of the score 33A and a lower end 30*b* of the long side 30 positioned below the end portion to each other, and the supporting body 32A in the use state can be obtained, as shown in FIG. 14(*a*), by coupling two projecting portions 320 and 32*c* thus caused to project to each other at their cutoff portions 39 as shown in FIG. 15(*b*). Further, in the supporting body 32A in the use state, when coupling of the two projecting portions 32*c* and 32*c* at the cutoff portions 39 is decoupled, the stored state shown in FIG. 15(*a*) is obtained again. It is to be noted that the score 33A is composed of a cut continuing over a whole length thereof in the lengthwise direction, but instead of such a break, a cutoff line composed of a plurality of cuts formed in a perforation manner. The other four supporting bodies 32 in the frame 38 are configured in the same manner as the supporting body 32A.

Figure 16:
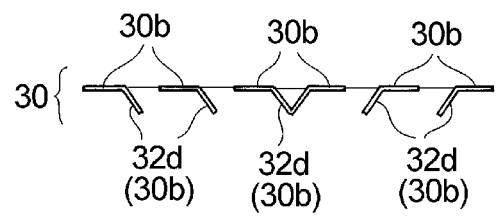
FIG. 16 is a bottom view of a portion of a side constituting another example of the frame in the pet toilet of the present invention.

Though the preferred embodiments of the present invention have been described above, the present invention is not limited to the above-described embodiments. For example, in the embodiments, each supporting body is composed of two or more projecting portions, but as shown in FIG. 16, a supporting body may be composed of only one projecting portion. In the example shown in FIG. 16, such a configuration is adopted that the supporting body is formed by setting a portion positioned front a score or a cutoff line on the side of the lower end 30*b* as the projecting portion 32*d* pivotable inward of the frame by performing such a process as forming the score or the cutoff line (not shown) in the vicinity of the lower end 30b of the long side 30 constituting the frame and only pushing in (folding) the projecting portion 32d inward of the frame at a use time.

Figure 15A:
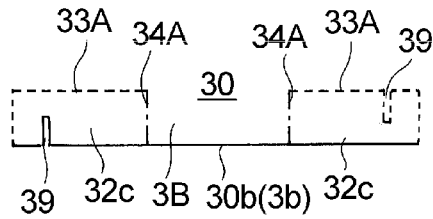
FIG. 15(a) is a side view showing a state (a stored state) of a nonuse state of a supporting body in the frame shown in FIG. 14
Figure 15B:
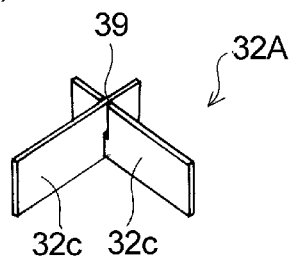
FIG. 15(b) is a perspective view showing a use state of the supporting body.
Figure 17:
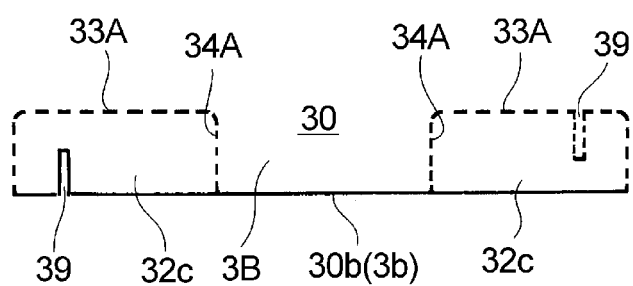
FIG. 17 is a view showing a nonuse state (a stored state) of a modified example of the supporting body in the frame shown in FIG. 14 and corresponding to FIG. 15(a).

Further, regarding the supporting body composed of a portion of a side constituting the frame or the small frame (the treatment material storing case), for example, in the supporting body 32A of the frame 38 shown in FIG. 14, as shown in FIG. 15(a), a corner portion of an approximately L-shaped score 33A thrilling a contour of the supporting body 32A and a corner portion between the score 33A and the bend line 34A are formed in an approximately right angle, respectively, but as shown in FIG. 17, corner portions may be rounded. By thus forming the corner portion of the score (the cutoff line) forming the contour of the supporting body, the corner portion being positioned on the side opposite to a lower end (the lower end of the side where the supporting body is present) of the frame, as a rounded corner portion, impression from the appearance of the toilet becomes tender, which results in improvement in design. Such roundness of the corner portion of the score (the cutoff line) forming the contour of the supporting body can be also applied to not only the frame 38 but also the above-described frame 3, where corner portions (see FIG. 3) between the score 33 and the respective two bend lines 34 and 34 may be rounded corner portions.

Further, in the embodiments, the absorbent member 21 and the bottom plate 22 are each one plate-like or sheet-like member, but the absorbent member and the bottom plate may be configured by arranging a plurality of plate-like or sheet-like members in parallel within the frame. Further, the number and the arrangement portion of supporting bodies are not limited to the above-described embodiments, but they may be set properly. Further, when an animal (for example, a dog or the like) which has no habit putting sand on the excretion to conceal the same uses the pet toilet, the drainboard 20 can be removed from the toilet in addition to that the excretion treatment material 5 becomes unnecessary. In this case, as the footing-constituting member 2, only the bottom plate 22 and absorbent member 21 or only an absorbent member 21 having a sufficiently high strength can be adopted. A portion which only one of the above-described embodiments has can be mutually utilized in all the other embodiments properly, and an aspect obtained by modifying or combining different portions of the respective embodiments properly can be adopted.

Regarding the above-described embodiments of the present invention, the following additional statements (the pet toilet) will be disclosed.

<1> A pet toilet comprising a footing-constituting member constituting a footing for a pet conducting an excreting action, and a frame which is rectangular in a plan view and surrounds the footing-constituting member, wherein
the frame is configured so as to be foldable by folding one set of opposite sides of two sets of opposite sides constituting the frame in such a manner that lengthwise central portions of the one set of the opposite sides constituting the frame are directed inward of the frame,
the footing-constituting member is supported from a lower side of the footing-constituting member by supporting bodies, the supporting bodies projecting from inner circumferential faces of the frame toward the inside of the frame, and
the supporting bodies are composed of portions of sides constituting the frame, are arranged to be approximately flush with inner circumferential faces of the frame without projecting the inner circumferential faces to be put in a stored state during nonuse, and are caused to project inward of the frame to be put in use state during use.

<2> The pet toilet according to the above-described item <1>, wherein a frame reinforcing member bridging between one set of the supporting bodies opposite to each other is arranged below the footing-constituting member, and
the frame reinforcing member is integrated with the side constituting the frame to be put in a stored state during nonuse, and is separated from the side to be coupled to each of one set of the supporting bodies opposite to each other during use.

<3> The pet toilet according to the above-described item <2>, wherein a cutoff line composed of a plurality of cuts is formed in the vicinity of an upper end of each of a set of the opposite sides constituting the frame, the cuts are formed in a perforation manner, and a portion surrounded by the cutoff line constitutes the frame reinforcing member in a stored state.

<4> The pet toilet according to the above-described item <2> or <3>, where the frame reinforcing member has rectangular cutoff portions, which are used when the reinforcing member is fitted to the supporting bodies, at lengthwise both end portions thereof, and has a rectangular cutoff portion, which is used when the reinforcing member is fitted to another reinforcing member, at an approximately central portion thereof.

<5> The pet toilet according to any one of the above-described items <1> to <4>, wherein the footing-constituting member is configured to include a drainboard through which excretion liquid of a pet can pass, and a liquid-retainable absorbent member arranged below the drainboard.

<6> The pet toilet according to the above-described item <5>, wherein the drainboard has a plurality of projecting portions on a lower face thereof, and the drainboard comes in contact with the absorbent member at the projecting portions.

<7> The pet toilet according to the above-described item <5> or <6>, wherein the footing-constituting member is configured to further include a bottom plate arranged below the absorbent member.

<8> The pet toilet according to any one of the above-described items <5> to <7>, wherein the drainboard and the absorbent member are stored in a cylindrical waterproof bag having a bottom, an upper end of the waterproof bag is opened as an opening portion, a bottom portion side of the water-resistant bag is stored in the frame, an upper portion side of the water-resistant bag extends outwardly from an upper end of the frame, and an extension portion of the waterproof bag is folded back to the side of the outer circumferential face of the frame.

<9> The pet toilet according to any one of the above-described items <5> to <8>, wherein an excretion treatment layer is formed on an upper face of the drainboard by loading an excretion treatment material on the upper face of the drainboard,
the excretion treatment layer is stored in a cylindrical liquid-permeable bag having a bottom, an upper end of the liquid-permeable bag is opened as an opening portion, a bottom portion side of the liquid-permeable bag is stored in the frame, an upper portion side of the liquid-permeable bag extends outwardly from an upper end of the frame, and an extension portion of the liquid-permeable bag is folded back to the side of the outer circumferential face of the frame.

<10> The pet toilet according to any one of the above-described items <5> to <9>, wherein an excretion treatment layer is formed on an upper face of the drainboard by loading an excretion treatment material on the upper face, the excretion treatment material, together with the drainboard, is stored in a treatment material storing case placed on the absorbent member, and the treatment material storing case has such a size that the treatment material storing case can be stored in the frame and is composed of a small frame rectangular in a plan view and surrounding the drainboard, the small frame is configured so as to be foldable by folding one set of opposite sides of two sets of opposite sides constituting the small frame in such a manner that lengthwise central portions of the one set of the opposite sides constituting the small frame are directed inward of the small frame, the drainboard is supported from a lower side of the drainboard by drainboard supporting bodies, the drainboard supporting bodies projecting from inner circumferential faces of the small frame toward the inside of the small frame, and the drainboard supporting bodies are composed of portions of sides constituting the small frame, are integrated with the sides constituting the small frame to be approximately flush with inner circumferential faces of the small frame without projecting the inner circumferential faces during nonuse, and are caused to project inward of the small frame to be put in use state during use.

<11> The pet toilet according to the above-described item <10>, wherein outer circumferential faces of the frame and the small frame are different in color.

<12> The pet toilet according to the above-described item <10> or <11>, wherein at least one of the frame and the small frame has, in at least one side of four sides constituting the frame or the small frame, a punched portion having a predetermined shape and penetrating the at least one side in a thickness direction thereof.

<13> The pet toilet according to any one of the above-described items <10> to <12>, wherein upper ends of a set of opposite sides constituting the small frame are inclined.

<14> The pet toilet according to any one of the above-described item <1> to <13>, wherein the frame includes a score which bridges over a corner portion of the frame and extends in a circumferential direction, and a portion of the frame positioned below the score constitutes the supporting body.

<15> The pet toilet according to the above-described item <14>, wherein the score is a cutoff line composed of a plurality of cuts formed in a perforation manner, <16> The pet toilet according to any one of the above-described items <1> to <15>, wherein the frame includes two L-shaped scores in the vicinities of lower ends of a set of opposite sides constituting the frame, portions of the frame positioned below the scores constitute projecting portions which is pivotable inward of the frame, and a plurality of the projecting portions are coupled so that the supporting body is put in a use state.

<17> The pet toilet according to the above-described item <16>, wherein the projecting portions in the stored state have cutoff portions, which is used when the projecting portion is fitted to another projecting portion, in the vicinities of distal end portions of the projecting portions in a projecting direction when the projecting portions are caused to project inward of the frame.

<18> The pet toilet according to the above-described item <16> or <17>, wherein the score is a cutoff line composed of a plurality of cuts formed in a perforation manner.

<19> A use method of a pet toilet comprising a footing-constituting member constituting a footing for a pet conducting an excreting action, and a frame which is rectangular in a plan view and surrounds the footing-constituting member, wherein the frame is configured so as to be foldable by folding one set of opposite sides two sets of opposite sides constituting the frame in such a manner that lengthwise central portions of the one set of the opposite sides constituting the frame are directed inward of the frame, the footing-constituting member is supported from a lower side of the footing-constituting member by supporting bodies, the supporting bodies projecting from inner circumferential faces of the frame toward the inside of the frame, and the supporting bodies are composed of portions of the set of opposite sides constituting the frame, wherein the use method comprises a step of developing the frame in a folded state;

a step of causing the supporting bodies, which are arranged so as to be approximately flush with inner faces of the frame in the folded state and are put in a stored state, to project from the inner faces of the frame toward the inside of the frame; and a step of placing the footing-constituting member on the supporting bodies which have been caused to project.

Incidentally, the above item <1> can be restated by the following item <1A>.

<1A> A pet toilet comprising a footing-constituting member constituting a footing for a pet conducting an excreting action, and a frame which is rectangular in a plan view and surrounds the footing-constituting member, wherein the frame includes two sets of flat plates opposite to each other, and is configured to be foldable by folding one set of the flat plates of the two sets of the flat plates in such a manner that lengthwise central portions of the one set of flat plates are directed inward of the frame, the footing-constituting member is supported from a lower side of the footing-constituting member by supporting bodies, the supporting bodies projecting from inner circumferential faces of the frame toward the inside of the frame, and the supporting bodies are composed of portions of the flat plates constituting the frame, and are arranged to be approximately flush with inner circumferential faces of the frame without projecting the inner circumferential faces of the frame to be put in a stored state during nonuse, and are caused to project inward of the frame to be put in use state during use.

Further, the above-described item <2> is restated by the following item <2A>

<2A> The pet toilet according to the above-described item <1A>, wherein a frame reinforcing member bridged between one set of the supporting bodies opposite to each other is arranged below the footing-constituting member, and the frame reinforcing member is integrated with the flat plate constituting, the frame to be put in a stored state during nonuse, and is separated from the flat plate to be coupled to each of a set of the supporting bodies opposite to each other.

Furthermore, the above-described item <3> is restated by the following item <3A>.

<3A> The pet toilet according to the above-described item <2A>, wherein a cutoff line composed of a plurality of cuts is formed in the vicinity of an upper end of each of one set of the flat plates constituting the frame, the cuts are formed in a perforation manner, and a portion surrounded by the cutoff line constitutes the frame reinforcing member in a stored state.

Further, the above-described item <10> is restated by the following item <10A>.

<10A> The pet toilet according to any one of the above-described items <5> to <9> where an excretion treatment layer is formed on an upper face of the drainboard by loading an excretion treatment material on the upper face, the excretion treatment material together with the drainboard is stored in a treatment material storing case placed on the absorbent member, the treatment material storing case has such a size that the treatment material storing case can be stored in the frame and is composed of a small frame rectangular in a plan view and surrounding the drainboard, the small frame includes two sets of flat plates opposite to each other and is configured so as to be foldable by folding one set of the flat plates of two sets of the flat plates constituting the small frame in such a manner that lengthwise central portions of the one set of the flat plates constituting the small frame are directed inward of the small frame, the drainboard is supported from a lower side of the drainboard by drainboard supporting bodies, the drainboard supporting bodies projecting from inner circumferential faces of the small frame toward the inside of the small frame, and the drainboard supporting bodies are composed of portions of the flat plates constituting the small frame, are arranged to be approximately flush with inner circumferential faces of the small frame without projecting the inner circumferential faces during nonuse, and are caused to project inward of the small frame to be put in use state during use.

Furthermore, the above-described item <12> is restated by the following item <12A>.

<12A> The pet toilet according to the above-described item <10A> or <11>, wherein at least one of the frame and the small frame has, in at least one flat plate of flat plates constituting the frame or the small frame, a punched portion having a predetermined shape and penetrating the flat plate in a thickness direction thereof.

Furthermore, the above-described item <13> is restated by the following item <13A>.

<13A> The pet toilet according to any one of the above-described items <10A> to <12A>, wherein an upper end of the flat plate constituting the small frame is inclined.

Furthermore, the above-described item <14> is restated by the following item <14A>.

<14A> The pet toilet according to any one of the above-described items <1A> to <13A>, wherein the frame includes a score which bridges over a side at which two flat plates constituting the frame intersect each other and extends in a circumferential direction, and a portion of the frame positioned below the score constitutes the supporting body.

Furthermore, the above-described item <16> is restated by the following item <16A>.

<16A> The pet toilet according to any one of the above-described items <1A> to <15>, wherein the frame includes two L-shaped scores in the vicinities of lower ends of the flat plate constituting the frame, portions the frame positioned below the scores constitute projecting portions which is pivotable inward of the frame, and a plurality of the projecting portions are coupled so that the supporting body is put in a use state.

Furthermore, the above-described item <19> is restated by the following item <19A>.

<19A> A use method of a pet toilet comprising a footing-constituting member constituting a footing for a pet conducting an excreting action and a frame which is rectangular in a plan view and surrounds the footing-constituting member, where the frame includes two sets of flat plates opposite to each other, and is configured to be foldable by folding one set of the flat plates of the two sets of the flat plates in such a manner that lengthwise central portions of the set of the flat plates are directed inward of the frame, the footing-constituting member is supported from a lower side of the footing-constituting member by supporting bodies, the supporting bodies projecting from inner circumferential faces of the frame toward the inside of the frame, and the supporting bodies are composed of portions of the flat plates constituting the frame, wherein the use method comprises a step of developing the frame in a folded state;

a step of causing the supporting bodies, which are arranged so as to be approximately flush with inner faces of the frame in the folded state and are put in a stored state, to project from the inner faces of the frame toward the inside of the frame; and a step of placing the footing-constituting member on the supporting bodies which have been caused to project.

The invention claimed is:

1. A pet toilet comprising a footing-constituting member constituting a footing for a pet conducting an excreting action, and a frame which is rectangular in a plan view and surrounds the footing-constituting member, wherein
   the frame is configured so as to be foldable by folding one set of opposite sides of two sets of opposite sides constituting the frame in such a manner that lengthwise central portions of the one set of the opposite sides constituting the frame are directed inward of the frame,
   the footing-constituting member is supported from a lower side of the footing-constituting member by supporting bodies, the supporting bodies projecting from inner circumferential faces of the frame toward the inside of the frame,
   the supporting bodies are composed of portions of the two sets of opposite sides constituting the frame, are arranged to be approximately flush with inner circumferential faces of the frame without projecting the inner circumferential faces to be put in a stored state during nonuse, and are caused to project inward of the frame to be put in use state during use,
   the footing-constituting member is configured to include a drainboard through which excretion liquid of a pet can pass, and a liquid-retainable absorbent member arranged below the drainboard,
   an excretion treatment layer is formed on an upper face of the drainboard by loading an excretion treatment material on the upper face, the excretion treatment material, together with the drainboard, is stored in a treatment material storing case placed on the absorbent member, and the treatment material storing case has such a size that the treatment material storing case can be stored in the frame and is composed of a small frame rectangular in a plan view and surrounding the drainboard,
   the small frame is configured so as to be foldable by folding one set of opposite sides of two sets of opposite sides constituting the small frame in such a manner that lengthwise central portions of the one set of the opposite sides constituting the small frame are directed inward of the small frame, the drainboard is supported from a lower side of the drainboard by drainboard supporting bodies, the drainboard supporting bodies projecting from inner circumferential faces of the small frame toward the inside of the small frame, and the drainboard supporting bodies are composed of portions of sides constituting the small frame, are integrated with the sides constituting the small frame to be approximately flush with inner circumferential faces of the small frame without projecting the inner circumferential faces during nonuse, and are caused to project inward of the small frame to be put in use state during use.

2. The pet toilet according to claim 1, wherein a frame reinforcing member bridging between a pair of the supporting bodies opposite to each other is arranged below the footing-constituting member, and the frame reinforcing member is integrated with a side constituting the frame to be put in a stored state during nonuse, and is separated from the side to be coupled to each pair of the supporting bodies opposite to each other during use.

3. The pet toilet according to claim 2, wherein a cutoff line composed of a plurality of cuts is formed in the vicinity of an upper end of each set of the opposite sides constituting the frame, the cuts are formed in a perforation manner, and a portion surrounded by the cutoff line constitutes the frame reinforcing member in a stored state.

4. The pet toilet according to claim 2, where the frame reinforcing member has rectangular cutoff portions, which are used when the reinforcing member is fitted to both lengthwise end portions of the supporting bodies, and has a rectangular cutoff portion, which is used when the reinforcing member is fitted to another reinforcing member, at an approximately central portion thereof.

5. The pet toilet according to claim 1, wherein the drainboard has a plurality of projecting portions on a lower face thereof, and the drainboard comes in contact with the absorbent member at the projecting portions.

6. The pet toilet according to claim 1, wherein the footing-constituting member is configured to further include a bottom plate arranged below the absorbent member.

7. The pet toilet according to claim 1, wherein the drainboard and the absorbent member are stored in a cylindrical waterproof bag having a bottom, an upper end of the waterproof bag is opened as an opening portion, a bottom portion side of the water-resistant bag is stored in the frame, an upper portion side of the water-resistant bag extends outwardly from an upper end of the frame, and an extension portion of the waterproof bag is folded back to the side of the outer circumferential face of the frame.

8. The pet toilet according to claim 1, wherein the excretion treatment layer is stored in a cylindrical liquid-permeable bag having a bottom, an upper end of the liquid-permeable bag is opened as an opening portion, a bottom portion side of the liquid-permeable bag is stored in the frame, an upper portion side of the liquid-permeable bag extends outwardly from an upper end of the frame, and an extension portion of the liquid-permeable bag is folded back to the side of the outer circumferential face of the frame.

9. The pet toilet according to claim 1, wherein outer circumferential faces of the frame and the small frame are different in color.

10. The pet toilet according to claim 1, wherein at least one of the frame and the small frame has, in at least one side of four sides constituting the frame or the small frame, a punched portion having a predetermined shape and penetrating the at least one side in a thickness direction thereof.

11. The pet toilet according to claim 1, wherein upper ends of a set of opposite sides constituting the small frame are inclined.

12. The pet toilet according to claim 1, wherein the frame includes a score which bridges over a corner portion of the frame and extends in a circumferential direction, and a portion of the frame positioned below the score constitutes one of said supporting bodies.

13. The pet toilet according to claim 12, wherein the score is a cutoff line composed of a plurality of cuts formed in a perforation manner.

14. The pet toilet according to claim 1, wherein the frame includes two L-shaped scores in the vicinities of lower ends of a set of opposite sides constituting the frame, portions of the frame positioned below the scores constitute projecting portions which are pivotable inward of the frame, and said projecting portions are coupled to constitute one of said supporting bodies.

15. The pet toilet according to claim 14, wherein the projecting portions in the stored state have cutoff portions, which are used when a projecting portion is fitted to another projecting portion, in the vicinities of distal end portions of the projecting portions in a projecting direction when the projecting portions are caused to project inward of the frame.

16. The pet toilet according to claim 14, wherein each of said L-shaped scores is a cutoff line composed of a plurality of cuts formed in a perforation manner.

* * * * *